US009736057B2

United States Patent
Chinni et al.

(10) Patent No.: US 9,736,057 B2
(45) Date of Patent: Aug. 15, 2017

(54) FORWARDING PACKET FRAGMENTS USING L4-L7 HEADERS WITHOUT REASSEMBLY IN A SOFTWARE-DEFINED NETWORKING (SDN) SYSTEM

(71) Applicant: Telefonaktiebolaget L M Ericsson (publ), Stockholm (SE)

(72) Inventors: Bhaskara Chinni, Fremont, CA (US); Mark Hlady, San Jose, CA (US); Barnabás Helmajer, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 178 days.

(21) Appl. No.: 14/462,442

(22) Filed: Aug. 18, 2014

(65) Prior Publication Data

US 2016/0050140 A1 Feb. 18, 2016

(51) Int. Cl.
*G06F 15/173* (2006.01)
*H04L 12/721* (2013.01)
*H04L 12/823* (2013.01)
*H04L 12/801* (2013.01)

(52) U.S. Cl.
CPC .............. *H04L 45/14* (2013.01); *H04L 47/32* (2013.01); *H04L 47/34* (2013.01)

(58) Field of Classification Search
CPC .......... H04L 47/34; H04L 47/32; H04L 45/14
See application file for complete search history.

(56) References Cited

U.S. PATENT DOCUMENTS

| 8,532,107 | B1 * | 9/2013 | Ghosh | H04L 12/4633 370/392 |
| 2003/0231590 | A1 * | 12/2003 | Zhao | H04L 12/5602 370/230.1 |
| 2005/0243834 | A1 * | 11/2005 | Fukuda | H04L 29/06 370/395.1 |

(Continued)

FOREIGN PATENT DOCUMENTS

| CN | 103532672 A | 1/2014 |
| EP | 2 226 976 A1 | 9/2010 |

OTHER PUBLICATIONS

"OpenFlow Switch Specification", Version 1.3.3 (Protocol version 0x04), Open Networking Foundation, Sep. 27, 2013, 164 pages.

(Continued)

*Primary Examiner* — Philip Chea
*Assistant Examiner* — Mohammed Ahmed
(74) *Attorney, Agent, or Firm* — Nicholson De Vos Webster & Elliott LLP

(57) ABSTRACT

A network element of a software-defined networking (SDN) system forwards IP packet fragments without reassembly is disclosed. The network element receives an IP packet fragment and determines whether the fragment is the first fragment of an original IP packet. If the fragment is the first fragment, then fields in the first fragment that are associated with open systems interconnection layers (OSI) 4-7 are retrieved and placed in an entry in a fragment information table so that the entry is associated with the original IP packet. If the received fragment is not the first fragment, then a matching entry in the fragment information table is to be identified and the associated OSI layers 4-7 information is retrieved for processing the non-first fragment.

20 Claims, 9 Drawing Sheets

(56) References Cited

U.S. PATENT DOCUMENTS

| | | | | |
|---|---|---|---|---|
| 2010/0150148 A1* | 6/2010 | Kumar | H04L 45/40 | 370/389 |
| 2010/0226373 A1* | 9/2010 | Rowell | H04L 43/026 | 370/395.31 |
| 2011/0258335 A1* | 10/2011 | Mahamuni | H04L 45/00 | 709/230 |
| 2014/0098669 A1* | 4/2014 | Garg | H04L 47/12 | 370/235 |
| 2014/0269299 A1* | 9/2014 | Koornstra | H04L 41/0816 | 370/235 |
| 2016/0050140 A1* | 2/2016 | Chinni | H04L 47/34 | 709/242 |

OTHER PUBLICATIONS

McKeown, N. et al., "OpenFlow: Enabling Innovation in Campus Networks", Mar. 14, 2008, 6 pages.

J. Postel, "User Datagram Protocol," Aug. 28, 1980, 3 pages, RFC: 768.

"Transmission Control Protocol, DARPA Internet Program Protocol Specification," Sep. 1981, 91 pages, RFC: 793, Information Sciences Institute, University of Southern California, Marina del Rey, California.

T. Socolofsky, et al., "A TCP/IP Tutorial," Jan. 1991, 28 pages, Network Working Group, Request for Comments: 1180.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffserv Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.

B. Fenner, et al., "Management Information Base for the User Datagram Protocol (UDP)," Jun. 2005, 19 pages, Network Working Group, Request for Comments: 4113, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

E. Rosen, et al., "BGP/MPLS IP Virtual Private Networks (VPNs)," Feb. 2006, 47 pages, Network Working Group, Request for Comments: 4364, The Internet Society.

J. Babiarz, et al., "Configuration Guidelines for DiffServ Service Classes," Aug. 2006, 57 pages, Network Working Group, Request for Comments: 4594, The Internet Society.

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

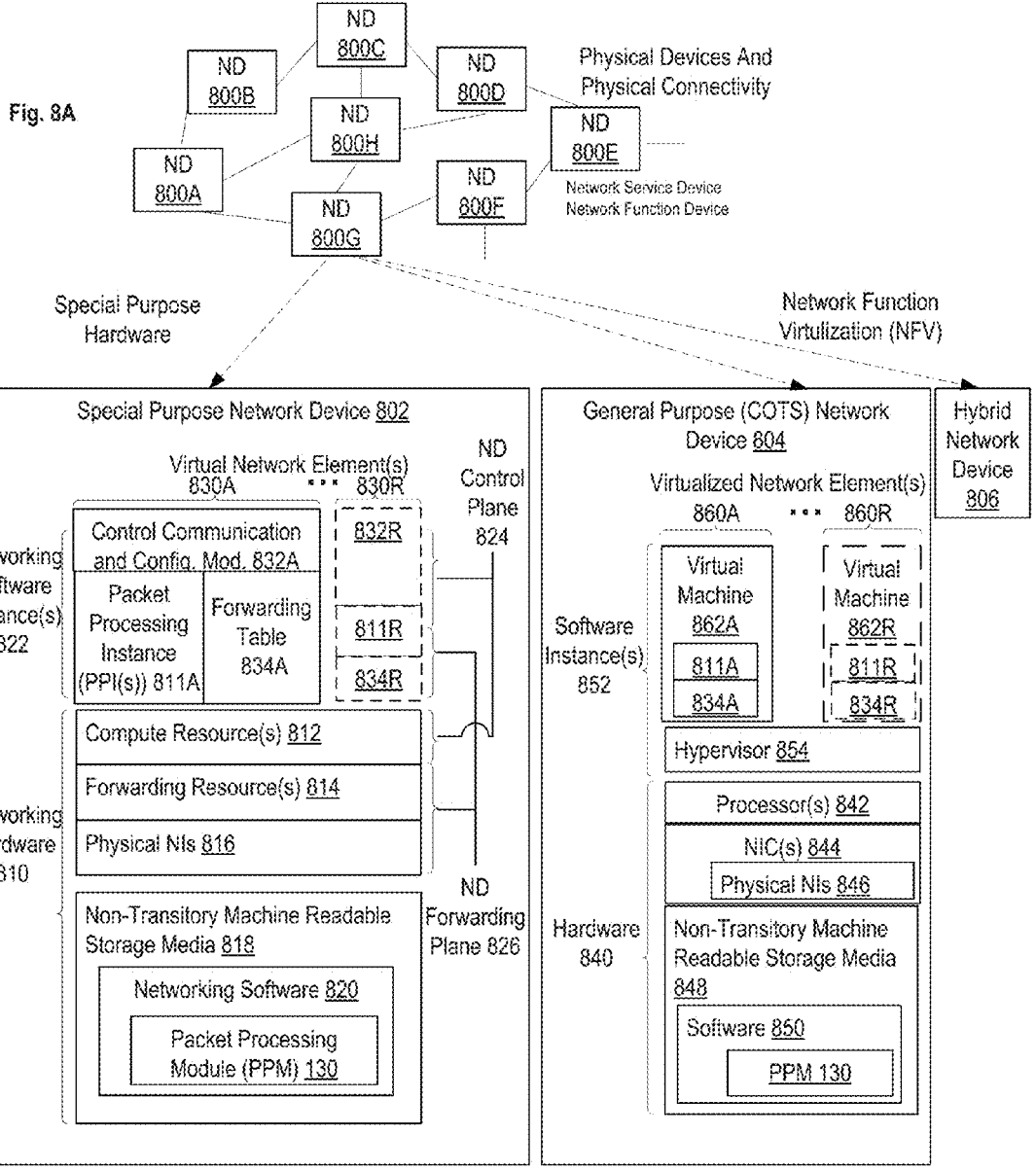
Fig. 8A
Fig. 8B

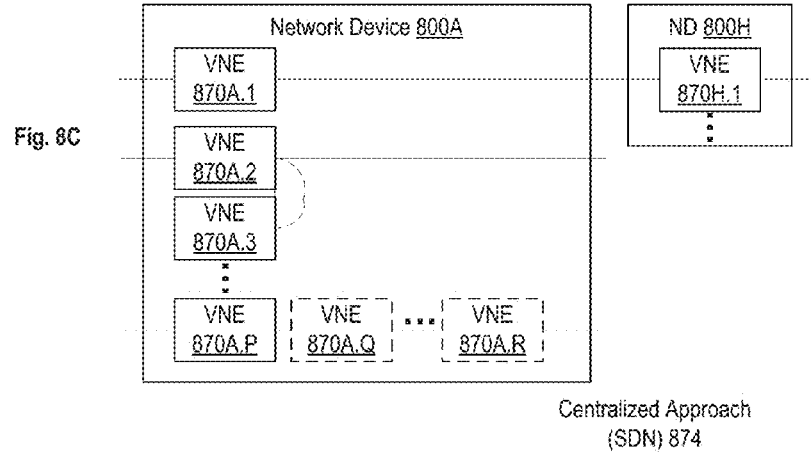
Fig. 8C
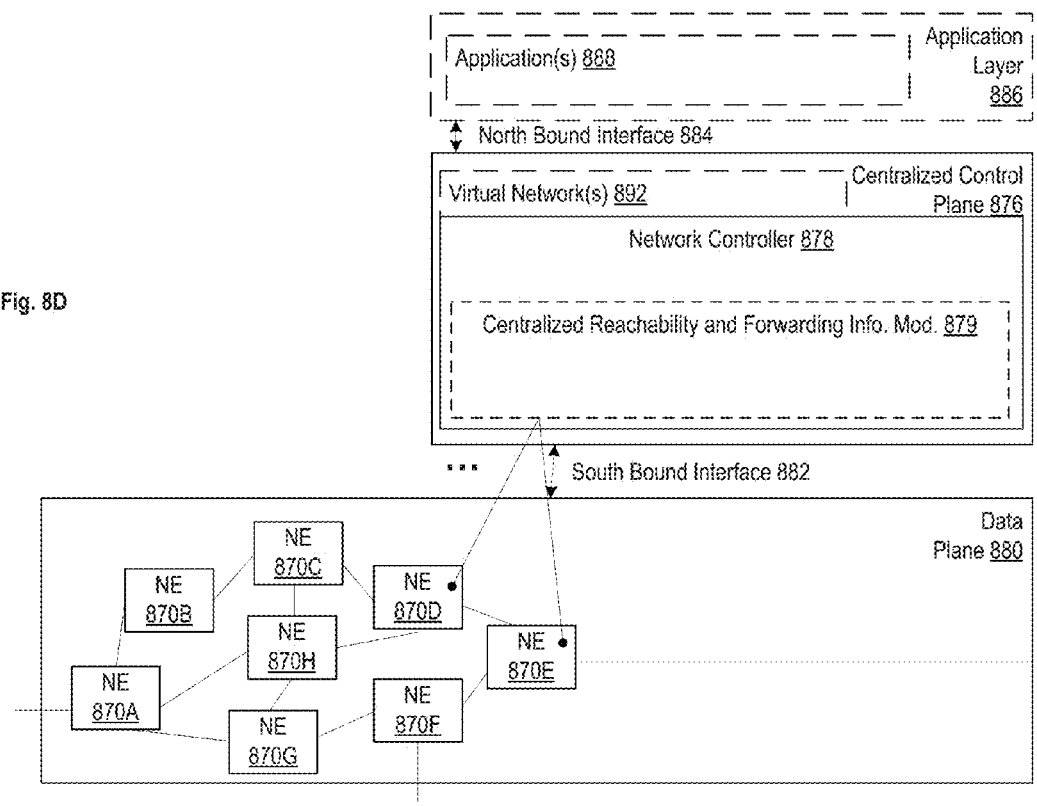
Fig. 8D
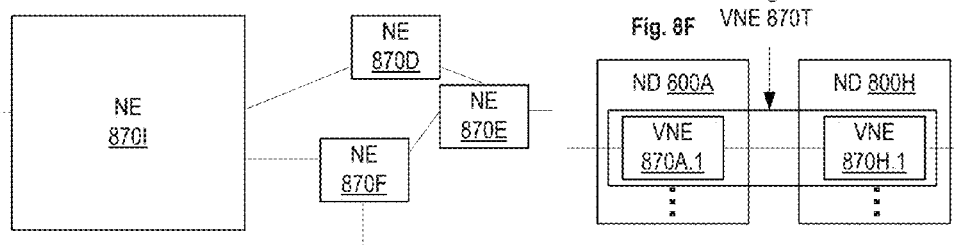
Fig. 8E
Fig. 8F

FORWARDING PACKET FRAGMENTS USING L4-L7 HEADERS WITHOUT REASSEMBLY IN A SOFTWARE-DEFINED NETWORKING (SDN) SYSTEM

FIELD

Embodiments of the invention relate to the field of software-defined networking (SDN) applications; and more specifically, to switching IP packet fragments in an SDN system.

BACKGROUND

An inherent characteristic of software-defined networking (SDN) system is the physical separation of control and data plane entities. In this model, applications (or network services) running on top of a network controller manage network wide policies and instruct the network controller to either proactively or reactively install forwarding entries in network elements. The collection of forwarding entries in all network elements form the forwarding state of the network. The network controller serves as a network operating system that controls and manages these programmable network elements and provides a programmatic interface to the higher-level network management and control applications.

A SDN application, for example a service chaining solution, forwards packets based on matching packet header information against flow entries defined by the SDN application. The OpenFlow 1.3 Specification, a common SDN network configuration protocol, supports matching of most fields from the Open Systems Interconnections (OSI) headers of Layer 2, Layer 3, and Layer 4 (also referred to as L2-L4 or Layers 2-4).

A network element may fragment an IP packet when the maximum transmission unit (MTU) of a link on which the packet needs to be transmitted is identified to be smaller than the packet size. Typically, only the first fragment of a datagram (the datagram is often referred to as the "original" packet) carries all the header information including L4-L7 headers with the remaining fragments only including L2 and IP (L3) headers. Any forwarding or service mechanisms that depend on L4-L7 header information such as TCP port numbers will fail to process, or incorrectly process, fragmented packets as not all fragments carry this information. Thus, IP packet fragments pose a problem to SDN applications.

OpenFlow describes procedures for handling fragments but these solutions are not ideal and, in many cases, are not even a valid solution for a real-world network design. One approach is to reassemble the entire IP packet before processing any one fragment. That requires waiting for all fragments to arrive before processing the first fragment. This may degrade performance of the network element and introduce packet latency. Another approach is to use the non-reassembly option of OpenFlow 1.3. However, the non-reassembly option may result in first fragments and non-first fragments being given different forwarding behaviors, possibly leading to traffic loss.

SUMMARY

A network element of a software-defined networking (SDN) system that forwards Internet Protocol (IP) packet fragments without reassembly is disclosed. The network element, implemented by one or more network devices, receives a packet and determines whether the packet contains a fragment of an original IP packet, where the original IP packet may be fragmented into at least two ordered fragments in which only the first fragment contains one or more fields associated with open systems interconnection (OSI) layers 4-7. Upon determining that the packet contains a fragment of the original IP packet, the network element determines whether or not the packet contains the first fragment of the original IP packet. Upon determining that the packet contains the first fragment of the original IP packet, the network element adds an entry to a fragment information table of the SDN system. The fragment information table entry is associated with the original IP packet and comprises data contained in the first fragment in one or more fields associated with OSI layers 4-7. The entry is used by the network element to process non-first fragments of the original IP packet. Before all fragments of the original IP packet are received, the network element processes the first fragment of the original IP packet based on the data contained in the one or more fields associated with OSI layers 4-7.

An apparatus for processing packets in a SDN system is disclosed. The apparatus comprises a processor and a non-transitory machine-readable storage media storing packet processing software, which when executed by the processor, causes the processor to forward IP packet fragments without reassembly. The processor receives a packet and determines whether the packet contains a fragment of an original IP packet. The original IP packet may be fragmented into at least two ordered fragments in which only the first fragment contains one or more fields associated with OSI layers 4-7. Upon determining that the packet contains a fragment of the original IP packet, the processor determines whether or not the packet contains the first fragment of the original IP packet. Upon determination that the packet contains the first fragment of the original IP packet, the processor stores an entry into a fragment information table. The fragment information table entry is associated with the original IP packet and comprises data contained the first fragment in the one or more fields associated with OSI layers 4-7 and is used to process non-first fragments of the original IP packet. Upon determination that the packet is not the first fragment (i.e. a non-first fragment) of the original IP packet, the processor searches in the fragment information table for a matching entry associated with the original IP packet and retrieves data contained in the first fragment in the one or more fields associated with OSI layers 4-7 of the matching entry.

The processor then identifies an entry in a forwarding table based on the data retrieved from the matching entry of the fragment information table and based on attributes in the identified forwarding table entry. The processor performs one or more actions that are specified in the identified forwarding table entry.

A non-transitory machine-readable storage medium storing instructions for processing packets in a network element is disclosed. The non-transitory machine-readable storage medium, when executed by a processor, causes the processor to perform operations implemented in a network device of the SDN system. The processor receives a packet and determines whether the packet contains a fragment of an original IP packet, where the original IP packet may be fragmented into at least two ordered fragments in which only the first fragment contains one or more fields associated with OSI layers 4-7. When the packet is determined to contain a fragment of the original IP packet, the processor determines whether or not the packet contains the first fragment of the original IP packet. When the packet is determined to contain the first fragment of the original IP packet, the processor adds an entry to a fragment information table. The fragment information table entry is associated with the original IP packet and comprises data contained in the one or more fields associated with OSI layers 4-7. The entry is used by the processor to process non-first fragments of the original IP packet. Before all fragments of the original IP packet are received, the processor processes the first fragment of the original IP packet based on the data contained in the one or more fields associated with OSI layers 4-7.

The embodiments of the invention enables a network element to correctly forward fragments of an original IP packet, where only the first fragment of the original IP packet contains one or more fields associated with OSI layers 4-7.

BRIEF DESCRIPTION OF THE DRAWINGS

The invention may best be understood by referring to the following description and accompanying drawings that are used to illustrate embodiments of the invention. In the drawings:

FIG. 8A illustrates connectivity between network devices (NDs) within an exemplary network, as well as three exemplary implementations of the NDs, according to some embodiments of the invention.

FIG. 8B illustrates an exemplary way to implement the special-purpose network device 802 according to some embodiments of the invention.

FIG. 8C illustrates various exemplary ways in which VNEs may be coupled according to some embodiments of the invention.

FIG. 8D illustrates a network with a single network element on each of the NDs of FIG. 8A and a centralized approach for maintaining reachability and forwarding information (also called network control), according to some embodiments of the invention.

FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 870I in one of the virtual network(s) 892 of FIG. 8D, according to some embodiments of the invention.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention.

DESCRIPTION OF EMBODIMENTS

Figure 1:
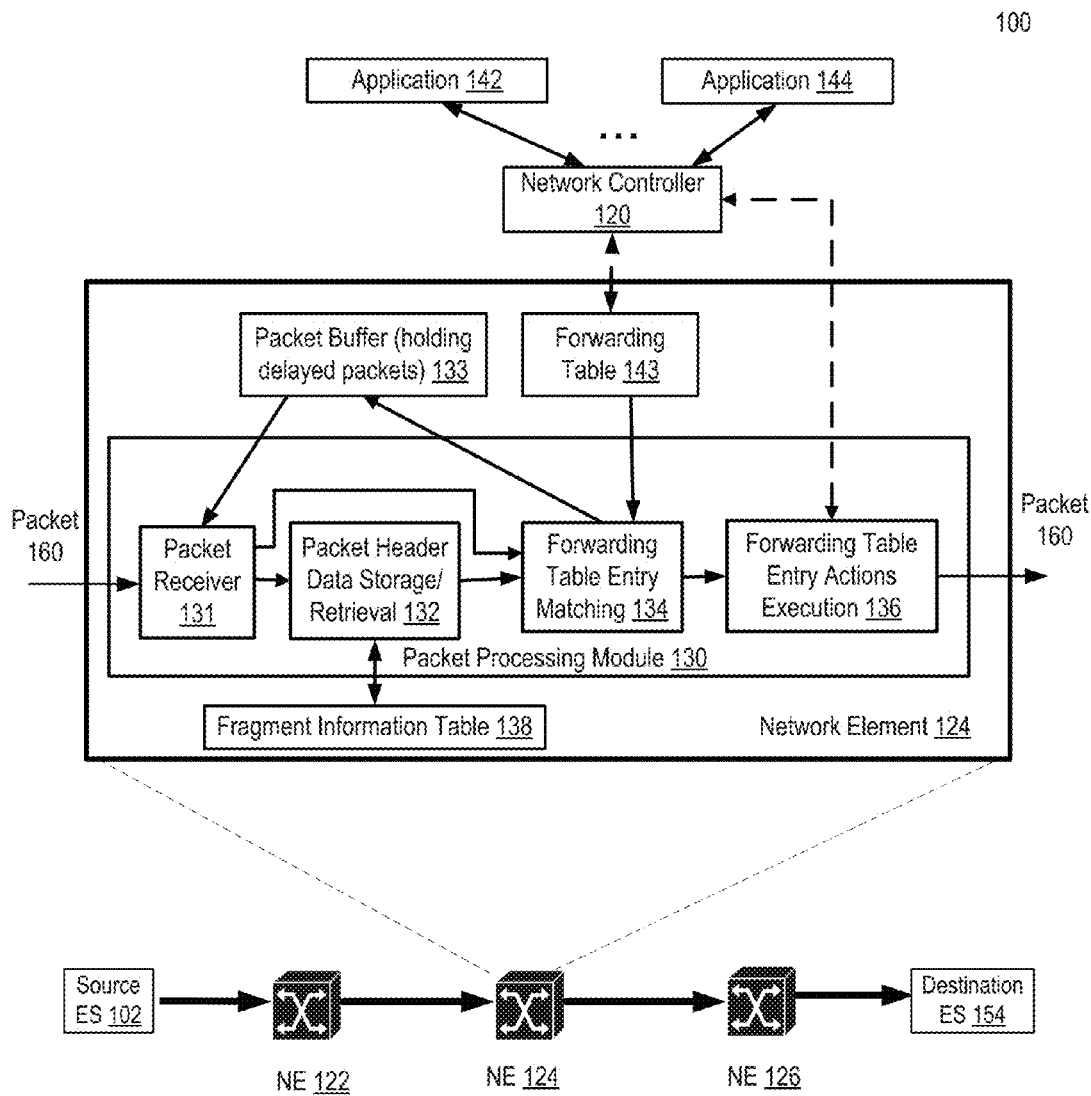
FIG. 1 is a block diagram illustrating a network implementing a method of forwarding packet fragments according to an embodiment of the invention.

The following description describes methods and apparatus for forwarding, without reassembly, IP packet fragments using information fields of the IP packet associated with open system interconnection (OSI) layers 4-7 header information. In an embodiment, the fields of the IP packet may be header fields.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Network Environment Utilizing Embodiments of the Invention

FIG. 1 is a block diagram illustrating a network implementing a method of forwarding packet fragments according to an embodiment of the invention. Network 100 contains a set of network elements (NEs), and it is managed by a network controller, which interfaces with a set of applications.

A network element performs packet forwarding implemented on one or more a network devices. If an original IP packet is fragmented before arriving at the network element, a packet received at the network element may only include a fragment of an original IP packet. The network element forwards each incoming packet of a traffic flow individually without re-assembling fragments into entire IP packets in the network element. Network 100 illustrates a traffic flow containing IP packets that come from source end station (ES) 102 and is delivered to destination end station 154, and forwarded through NEs 122, 124, and 126. Note the IP packets may be IPv4 or IPv6 packets depending on implementation.

An end station may be a user device or a server end station. User devices (sometimes referred to as an end user device or subscriber device) may include workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances). A server end station may include devices providing content and/or services participating in a peer to peer service, and may include, for example, public webpages (e.g., free content, store fronts, search services), private webpages (e.g., username/password accessed webpages providing email services), and/or corporate networks over VPNs.

Each network element may communicate with network controller 120 that manages network elements 122-126. The details of interactions among applications, network controllers, and network elements are discussed herein below in relating to FIGS. 8A-F. The functional blocks of NE 124 according to one embodiment of the invention is illustrated in the Figure 1. Referring to FIG. 1, the network controller 120 provides information to NE 124, which places the information in entries in a forwarding table 143 that resides within and is maintained by the network element. In an embodiment, the controller may determine the information to place in forwarding table entries based on global network knowledge including application-specific requirements received from applications 142 and 144. The interactions between network controller 120 and network element 124 are generally on the control path that coordinates packet forwarding of network element 124, and they are denoted with dotted lines. The interactions within network element 124 are generally on the data path that directly operates on received packets and they are denoted with solid lines.

A packet 160 is received by the network element and is processed in the packet processing module 130. Packet 160 refers to the data received as a unit in a single package at the network element, and may contain an entire original IP packet having identification information as sent from source ES 102, or packet 160 may contain only a fragment of an original IP packet from source ES 102. At the end of processing, packet 160 is forwarded to an end station, another network element, the network controller 120, or discarded.

The components of the packet processing module 130 form a pipeline. In one embodiment, packet processing module 130 contains four components: packet receiver 131, packet header data storage/retrieval 132, forwarding table entry matching 134, and forwarding table entry actions execution 136. The four components each perform a distinct function, although they may be implemented in one or more integrated entities in some embodiments.

Packet receiver 131 receives an incoming packet, such as an IP packet. Packet receiver 131 determines whether the incoming packet 160 contains an original IP packet or a fragment thereof. An original IP packet is a packet that was sent by source ES 102 and has not been fragmented. If the packet is an entire (i.e., non-fragmented) original IP packet, the network element forwards the entire IP packet to forwarding table entry matching 134. However, if packet 160 is only a fragment of an original IP packet, additional processing may be performed in the packet header data storage/retrieval 132. In an embodiment, packet receiver 131 may also receive packets from packet buffer 133, which contains a set of delayed packets. Delayed packets are packets that were previously received, but not yet completely processed. That is, their processing has been delayed as described more fully below. In an alternate embodiment, delayed packets may be retrieved for processing in the packet header data storage/retrieval 132.

Packet header data storage/retrieval 132 determines whether the fragment of an original IP packet is the first fragment of the original IP packet or a non-first fragment. If the fragment contained in packet 160 is a first fragment, then data in fields of the first fragment are extracted/retrieved from the fragment such as L4-L7 header information of the OSI model. This data may only be present in the first fragment of an original IP packet. Subsequent fragments may not contain this data. The retrieved data may be placed in an entry of the fragment information table 138 where it can be retrieved for processing subsequent packets containing non-first fragments.

Figure 2:
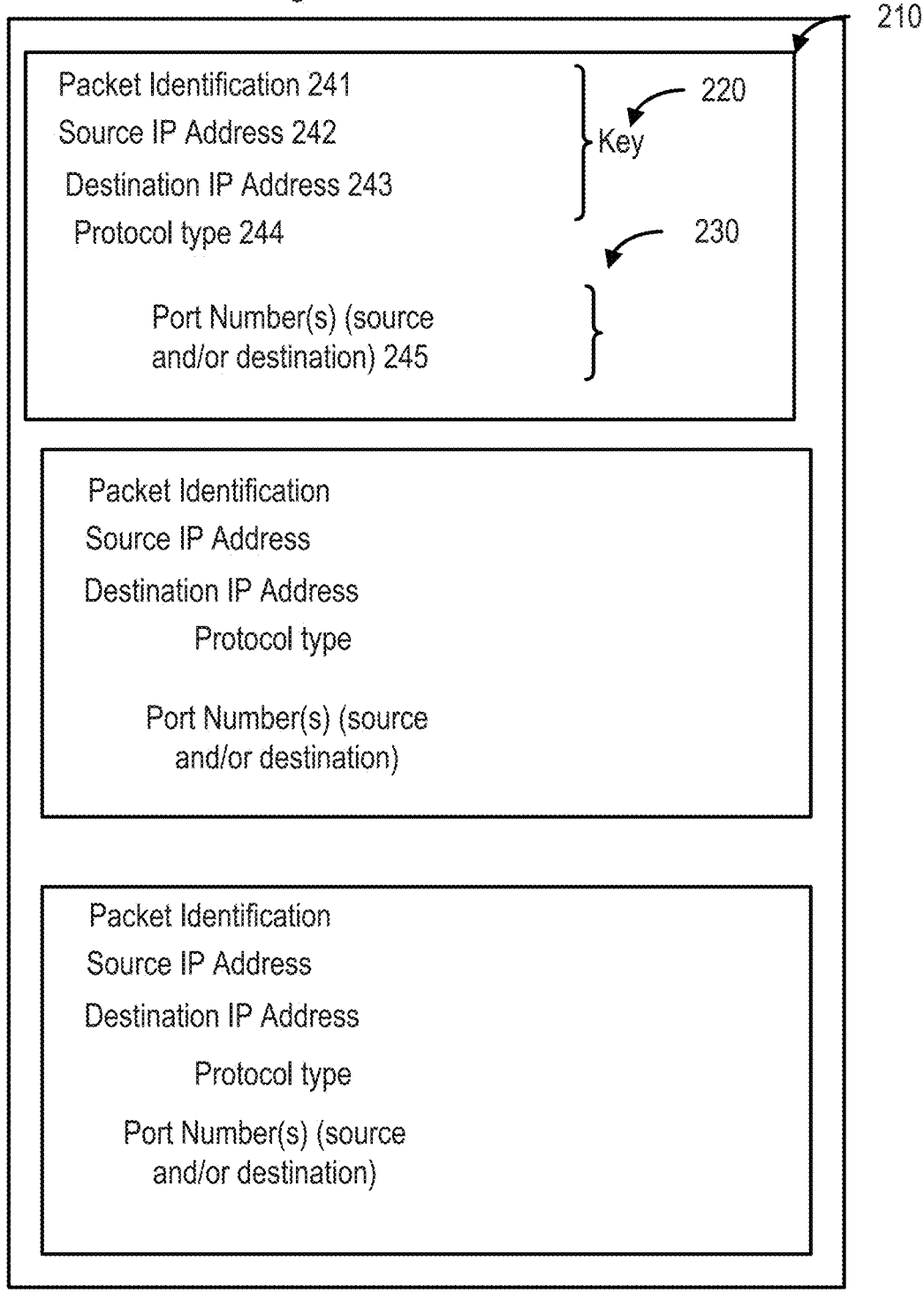
FIG. 2 is a block diagram illustrating entries in a fragment information table according to an embodiment of the invention.

FIG. 2 is a block diagram illustrating entries in a fragment information table according to an embodiment of the invention. Fragment information table 138 comprises an entry 210 for each distinct fragment of an original IP packet received by the network element. Each entry 210 includes key information 220 used to compare against data in an incoming fragment to select this entry as a matching entry. In one embodiment, the key 220 comprises information such as original IP packet identification 241 and flow identification information such as source IP address 242 (i.e., the IP address of Source ES 102), destination IP address 243 (i.e., the IP address of destination ES 154) and/or a protocol type 244 (e.g. TCP, UDP). In one embodiment, the key 220 includes all of the original IP packet identification 241, source IP address 242, destination IP addresses 243, and protocol type 244. While the key 220 comprises only L3 fields, in some embodiment, a key may comprises L2 fields such as MAC addresses and VLAN IDs, or a combination of L2/L3 fields. The fragment information table entry 210 may also include information 230 that is used by OSI layers 4 through 7 for processing in upper layer(s). For example, the fragment information table entry 210 comprises port number(s) 245, which may include a source port and/or a destination port, and which may be utilized to transmit the packet. The data contained in an entry in the fragment information table 138 may also be used to determine how to process the first fragment from which the data was retrieved. Note that the entries of fragment information table 138 may be updated periodically. For example, an entry may be deleted if not been used for a period of time.

If the incoming packet is any fragment other than the first fragment (referred to herein as a non-first fragment), the non-first fragment may not contain fields associated with OSI layers 4-7. In that case, the information in the L2 and/or L3 fields (e.g., header information) of the non-first fragment may be used to find a matching entry of the corresponding OSI layer 4-7 header information stored in the fragment information table 138. In an embodiment of the invention, the corresponding entry in the fragment information table 138 may be identified by matching a destination IP address and optionally a source IP address in the non-first fragment which identifies a flow, and a packet identification number in the non-first fragment which identifies the original IP packet from which the fragment was fragmented. When the flow and packet identification information matches key 220 information in an entry in the fragment information table 138, the OSI L4-L7 header information 230 in the entry 210 are retrieved. Packet processing continues in the forwarding table entry matching 134.

Packet fragments of an original IP packet may arrive out of order, and in particular, a non-first fragment may be received before the first fragment. When a non-first fragment is received before the first fragment of an original IP packet, there may not yet be a matching entry associated with the non-first fragment's original IP packet in the fragment information table 138. The processing of the non-first fragment may be delayed while waiting to receive the first fragment.

Packet buffer 133 is a holding area for delayed packet fragments. Fragments may be delayed until there is an associated entry in the fragment information table 138. Packet buffer may be associated with a timer, where packet fragments are discarded when a delay threshold of the timer is exceeded. In an embodiment, the delay threshold may be a maximum amount of elapsed time during which a fragment may be delayed. The delay threshold may be configured to be an amount of time during which the associated fragment information table entry is expected to be added. In an embodiment, a timer may track the amount of time each fragment waits to be processed, and periodically, the timer may be compared to the delay threshold to determine whether the delay time exceeds the configured delay threshold value. In an embodiment, the timer may be initialized to be the value of the delay threshold, count down to zero, and send a notification when the timer expires. In an alternate embodiment, the delay threshold may be a maximum number of attempts to find the needed fragment information table entry. A delay threshold may be configured to be the maximum number of times the fragment information table may be searched for a matching entry. Each time the table is searched for an entry needed for processing a particular delayed fragment, a counter value may be incremented. In an embodiment, the delay threshold is exceeded when the counter value exceeds the configured maximum number of tries.

When the needed table entry becomes available before exceeding the delay threshold, fragments that have been delayed waiting for that entry may be re-processed (i.e., continue to be processed).

Forwarding table entry matching 134 may use data from packet 160 only to match an entry in forwarding table 143 if packet 160 is an original IP packet or a first fragment thereof. If packet 160 is a non-first fragment though, forwarding table entry matching 134 additionally uses the OSI L4-L7 information 230 retrieved from the fragment information table 138 to match an entry in forwarding table 143.

Figure 3:
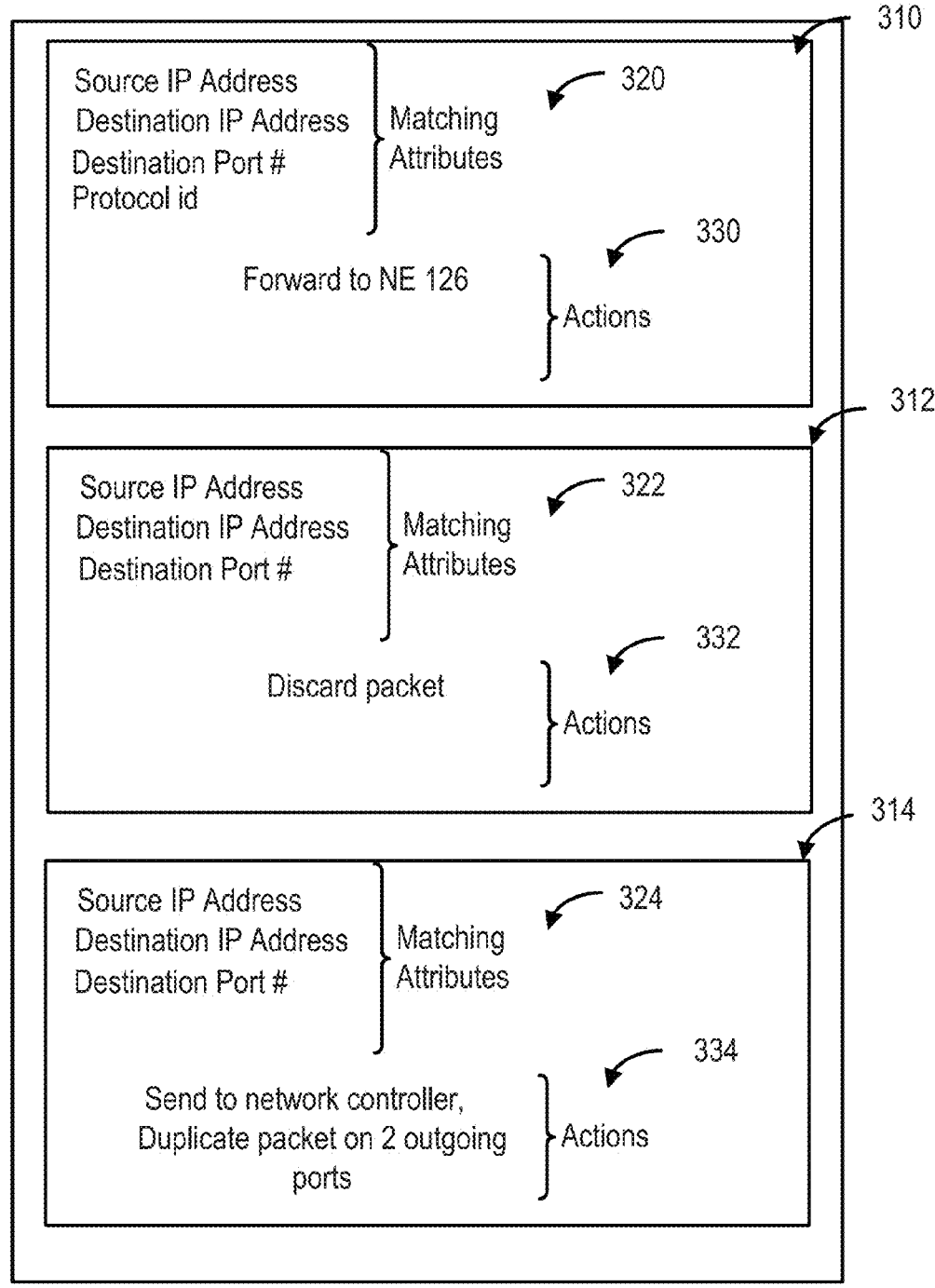
FIG. 3 is a block diagram illustrating entries in a forwarding table 143 according to an embodiment of the invention.

FIG. 3 is a block diagram illustrating entries in a forwarding table 143 according to an embodiment of the invention. Each entry of a forwarding table 143 includes a set of matching attributes and a set of actions. Entries 310-314 includes matching attributes 320-324 and actions 330-334 respectively. A forwarding table entry 310 is selected when the OSI L4-L7 data matches data in the matching attributes 320 fields of the table entry. When forwarding table entry is selected, the actions data is used to determine how to process the packet 160. In an embodiment, the actions data may direct the network element to forwarding a packet to a statically configured next network element towards the destination IP address. For example, forwarding table entry 310 may indicate that when a packet contains a destination address of destination ES 154, the packet is to be forwarded to network element 126, which is known to be closer to destination ES 154. Other actions that may be specified in a forwarding table entry include: sending the packet to the network controller 120 for additional processing (entry 314), dropping/discarding the packet, or replicating the packet on multiple outgoing interfaces. If no forwarding table entry has matching attributes 320 that match data in packet 160, a default action may be taken such as discarding the packet. When a matching forwarding table entry is found, processing continues in the forwarding table entry actions execution 136.

Forwarding table entry actions execution 136 performs the actions specified in the forwarding table entry. For example, if the action is to send the packet to the controller, the forwarding table entry actions execution 136 will send the packet to network controller 120. The network controller may determine a next network element to which to forward the packet or other action when the decision requires costly computation or global knowledge of the network that is not available in the network element. For example, the next network element towards which the packet should be forwarded may be dynamically determined by the network controller 120 based on global network information (e.g. performing load balancing by considering current network traffic). The network controller 120 may return the packet to the network element with instructions regarding where to forward the packet. The forwarding table entry actions execution 136 may also determine a dynamic forwarding address based on the real-time environment known to the network element. For example, the network element may be aware of which network interfaces are available for forwarding traffic, and an available interface selected in real time. If the action is to send the packet to a next network element, the forwarding table entry actions execution 136 will send the packet to specified network element. The packet may also be discarded at the network element.

Process Flow

Figure 4:
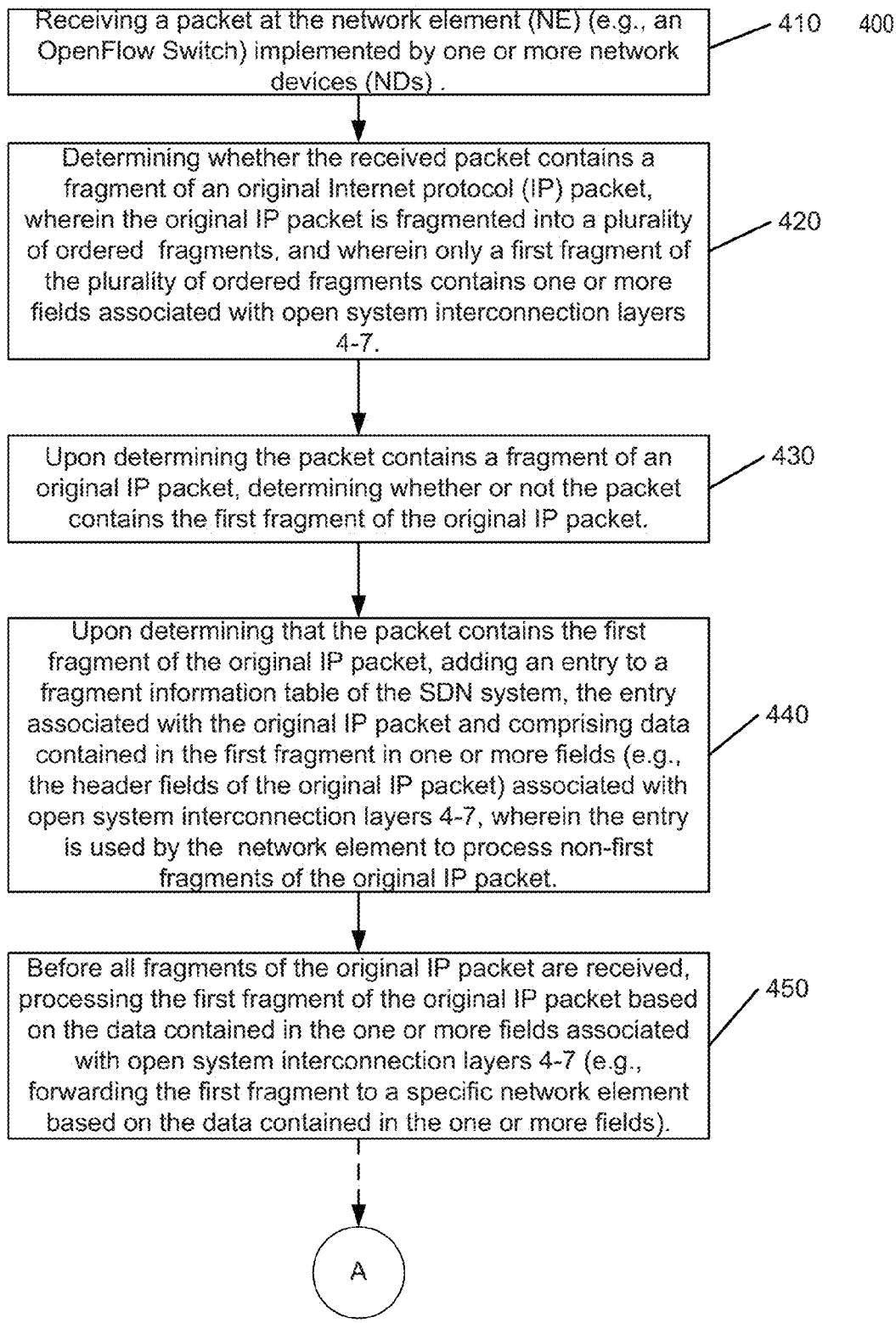
FIG. 4 is a flow diagram illustrating a method for processing IP packet fragments at a network element in an SDN system according to one embodiment of the invention.
Figure 5:
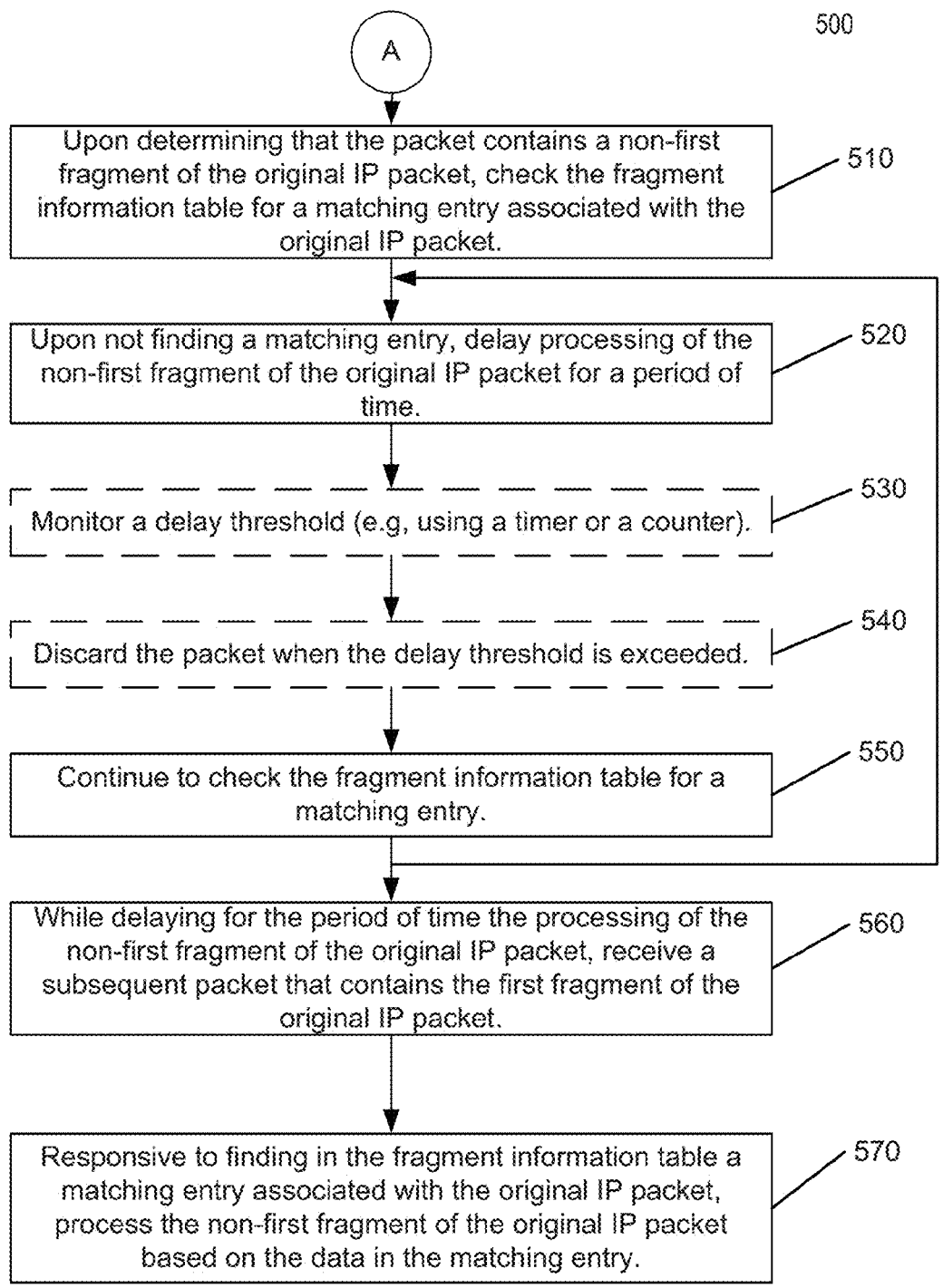
FIG. 5 is a flow diagram illustrating another method for processing IP packet fragments at a network element in an SDN system according to one embodiment of the invention.
Figure 6:
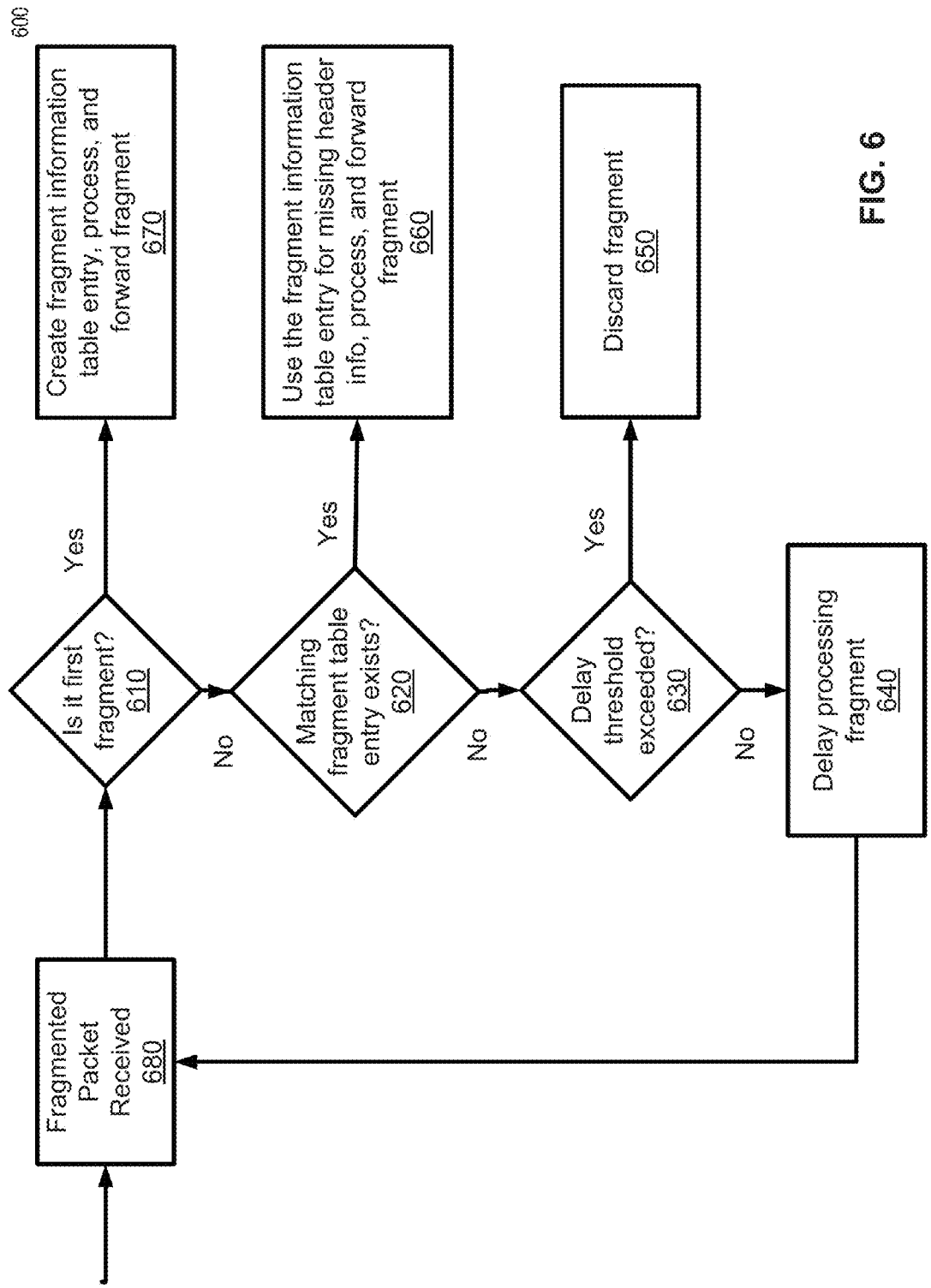
FIG. 6 is a flow diagram illustrating a method for using IP packet header information in a first IP fragment for processing subsequent IP packet fragments according to an embodiment of the invention.

FIGS. 4-6 are flow diagrams illustrating the method of processing packet fragments. While the flow diagrams in the figures show a particular order of operations performed by certain embodiments of the invention, it should be understood that such order is exemplary (e.g., alternative embodiments may perform the operations in a different order, combine certain operations, overlap certain operations, etc.). Also, the operations of the flow diagrams will be described with reference to the exemplary embodiments of the other diagrams such as FIGS. 1 and 8. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

FIG. 4 is a flow diagram illustrating a method for processing IP packet fragments at a network element in an SDN system according to one embodiment of the invention. Method 400 may be performed by a network element of the SDN system, more specifically a packet processing module of the network element such as packet processing module 130 of FIG. 1. The network element is an OpenFlow Switch in one embodiment. In that case, the operations of the OpenFlow switch comply with OpenFlow specification.

At reference 410, the network element receives a packet. The network element is implemented by one or more network devices as discussed herein below. At reference 420, the network element determines whether the packet contains a fragment of an original Internet protocol (IP) packet. An original IP packet is fragmented into a plurality of ordered fragments when the MTU of a link on which the packet needs to be transmitted is identified to be smaller than the packet size. In the packet fragments, only a first fragment of the plurality of ordered fragments contains one or more fields associated with open system interconnection layers 4-7, where the one or more fields may be used for forwarding the first fragment.

At reference 430, upon determining the packet contains a fragment of the original IP packet, the network element determines whether or not the packet contains the first fragment of the original IP packet. If the packet contains the first fragment, at reference 440, the network element adds an entry to a fragment information table of the SDN system. If the fragment information table is not set up yet, the network element sets up the fragment information table first and then populate the fragment information table with the entry. The entry is associated with the original IP packet and comprising data contained in the first fragment in the one or more fields associated with open system interconnection layers 4-7, and the entry is used by the network element to process non-first fragments of the original IP packet. One embodiment of the fragment information table is illustrated in FIG. 2.

Referring back to FIG. 4, at reference 450, before all fragments of the original IP packet are received, the network element processes the first fragment of the original IP packet based on the data contained in the first fragment in the one or more fields associated with open system interconnection layers 4-7. In one embodiment, the processing includes forwarding the first fragment to a specific network element based on the data contained in the first fragment in the one or more fields associated with open system interconnection layers 4-7.

Method 400 includes operations to process the first fragment of an original IP packet. In one embodiment, method 400 is followed by method 500, which process the non-first fragment of the original IP packet.

FIG. 5 is a flow diagram illustrating another method for processing IP packet fragments at a network element in an SDN system according to one embodiment of the invention. Method 500 includes operations to process non-first fragments of an original packet. Method 500 may be performed by a network element of the SDN system, more specifically a packet processing module of the network element such as packet processing module 130 of FIG. 1. Method 500 starts with the assumption that a fragment information table is already set up at the network element.

At reference 510, upon determining a received packet contains a non-first fragment of the original packet, the network element checks the fragment information table for a matching entry associated with the original IP packet. At reference 520, upon not finding a matching entry, the network element delays processing of the non-first fragment of the original packet for a period of time.

Then optionally at reference 530, the network element monitors a delay threshold for the non-first fragment. The delay threshold may be a timer set to expire upon a predetermined time without finding a matching entry, or a counter set to reset upon a predetermined number of times the network element checking the fragment information table for a matching entry. The delay threshold may be different for different original IP packets or different segments of an original IP packet. At reference 540, the network element discard the packet when the delay threshold is exceeded.

At reference 550, after the period of time, the network element continues to check the fragment information table for a matching entry for the non-first fragment. If no matching entry is found, the flow may go back to reference 520. The loop continues if no matching entry is found and the delay threshold is not exceeded. While delaying for the period of time the processing of the non-first fragment of the original IP packet, the network element receives a subsequent packet that contains the first fragment of the original packet at reference 560. The network element may add an entry to the fragment information table according to method 400. After that, the network element would be able to find a matching entry for the non-first fragment.

At reference 570, in response to finding in the fragment information table a matching entry associated with the original IP packet for the non-first fragment, where the matching entry contains data from the first fragment of the original IP packet, the network element process the non-first fragment of the original IP packet based on the data in the matching entry.

FIG. 6 is a flow diagram illustrating a method for using IP packet header information in a first IP fragment for processing subsequent IP packet fragments according to an embodiment of the invention. Method 600 may be performed by a network element of the SDN system, more specifically a packet processing module of the network element such as packet processing module 130 of FIG. 1.

At reference 680, the network element receives a fragmented packet, which is a fragment of an original IP packet. At reference 610, the network element determines whether the received fragment is a first fragment of the original IP packet. If the received fragment is determined to be the first fragment, at reference 670, the network element extracts data from L4-L7 headers of the first fragment and the extracted data is stored within a fragment information table entry that is created for the associated original IP packet. The received first fragment is then forwarded.

If at reference 610, the network element determines that the received fragment is not the first fragment (thus non-first fragment), then processing proceeds to operation 620, where the network element determines whether there is an entry in the fragment information table that matches the received non-first fragment (i.e. an entry associated with the original IP packet from where the fragment originates). If a matching table entry exists, then the flow goes to reference 660, where the network element retrieves the data stored in the matching fragment information table entry and uses the data to forward the received non-first fragment.

If at reference 620, the network element determines that there is no matching fragment information table entry, then processing proceeds to reference 630, where the network element determines whether a delay threshold has been exceeded. A delay threshold is exceeded when a non-first fragment has waited too long to be processed. If the delay threshold for the received non-first fragment is exceeded, then the network element discards the fragment at reference 650. In one embodiment, in addition to discarding the fragment, the network element also discard other non-first fragments of the same original IP packet waiting to be processed.

If at reference 630, the network element determines that the delay threshold has not been exceeded, the network element delays the processing of the fragment at reference 640. For example, the fragment may be placed in packet buffer 133 of FIG. 1. After waiting for a period of time, the delayed fragment may be processed again by operations in reference 680 with the expectation that during the waiting time, the first fragment may have arrived and the needed fragment information table entry created.

Packet Fragment Headers

Figure 7:
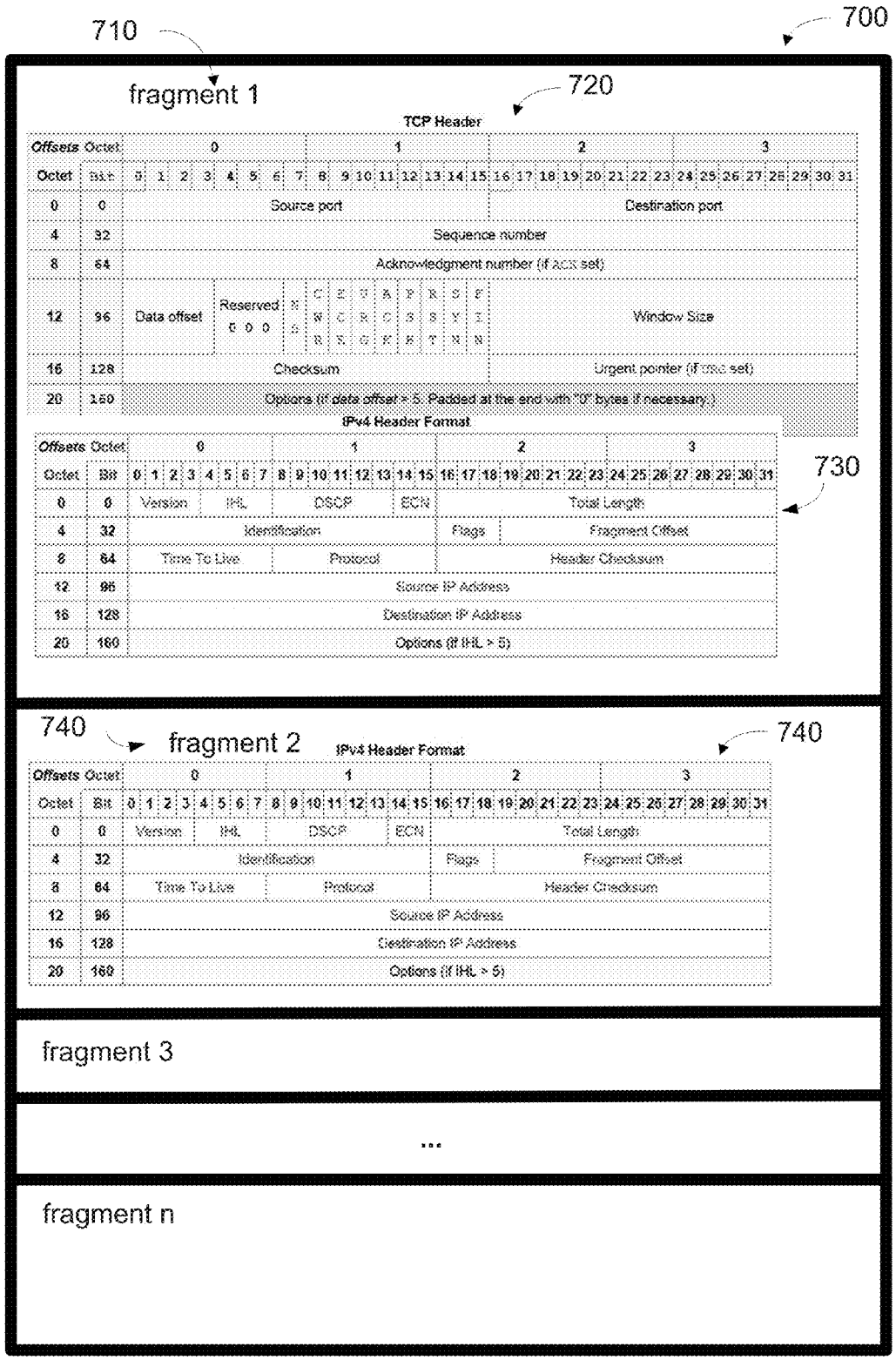
FIG. 7 is a diagram illustrating an IP packet broken into fragments, according to an embodiment of the invention.

FIG. 7 is a diagram illustrating an IP packet broken into fragments, according to an embodiment of the invention. Packet 700 is an entire IP packet, such as an original IP packet. Packet 700 contains several headers such as a TCP Header 720 or UDP Header (layer 4) and an IP header 730 (layer 3). In an embodiment, the IP header may be an IPv4 header. In an alternate embodiment, the IP header may be an IPv6 header. Headers for layers 5-7 may also be associated with the packet, but are not explicitly illustrated in FIG. 7. The following example describes data in the headers illustrated in FIG. 7 that may be useful for an SDN application. The information provided by this data and the location of the data is based on the particular headers shown in the example. In general, any data in any field of any header may be used. When an IP packet is fragmented, fragment 1 (710) is the first fragment and contains all of the headers for the IP packet. Other fragments such as fragment 2 (740) through fragment n may only contain the layer 2 (not illustrated) and layer 3 headers such as (IPv4 or IPv6). Using the TCP Header 720 in the fragment 1 (710) as an example, fields in the header that may be retrieved and stored in the fragment information table may be source port and (bits 0-15) and destination port (bits 16-31), and sequence number (bits 32-63).

Data in fields in the layer 4 header that may be stored in the fragment information table may include source port, destination port, sequence number, and/or acknowledgment number. Data in fields in the layer 3 header that may be stored in the fragment information table entry may include identification (bits 32-47), source IP address (bits 96-127), and destination IP address (bits 128-159). The fragment offset (bits 51 to 63) specifies an offset within the original IP packet where the fragment begins and may be used to determine whether the fragment being processed is a first or a non-first fragment. A fragment offset of zero indicates that the fragment is the first fragment, and any non-zero offset indicates a non-first fragment.

Systems and Network Devices to Implement Embodiments of the Invention

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, layer 2 aggregation, session border control, Quality of Service, and/or subscriber management), and/or provide support for multiple application services (e.g., data, voice, and video).

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application—specific integrated—circuits (ASICs) and a proprietary operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820 that includes packet processing module (PPM) 130, whose operations are disclosed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822, including instances of packet processing module (referred to as packet processing instances or PPI(s)) 811A. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module), packet processing instances 811A-R, and forwarding table(s) 834A-R, such that a given virtual network element (e.g., 830A) includes the control communication and configuration module (e.g., 832A), packet processing instances (e.g. 811A-R), and a set of one or more forwarding table(s) (e.g., 834A), and that portion of the networking hardware 810 that executes the virtual network element (e.g., 830A).

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850 that includes packet processing module (PPM) 130. During operation, the processor(s) 842 execute the software 850 to instantiate a hypervisor 854 (sometimes referred to as a virtual machine monitor (VMM)) and one or more virtual machines 862A-R that are run by the hypervisor 854, which are collectively referred to as software instance(s) 852. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 862A-R, and that part of the hardware 840 that executes that virtual machine (be it hardware dedicated to that virtual machine and/or time slices of hardware temporally shared by that virtual machine with others of the virtual machine(s) 862A-R), forms a separate virtual network element(s) 860A-R.

The virtual network element(s) 860A-R perform similar functionality to the virtual network element(s) 830A-R. For instance, the hypervisor 854 may present a virtual operating platform that appears like networking hardware 810 to virtual machine 862A, and the virtual machine 862A may be used to implement functionality similar to the control communication and configuration module(s) 832A, packet processing instances 811A-R, and forwarding table(s) 834A-R (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 862A-R differently. For example, while embodiments of the invention are illustrated with each virtual machine 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 854 includes a virtual switch that provides similar forwarding services as a physical Ethernet switch. Specifically, this virtual switch forwards traffic between virtual machines and the NIC(s) 844, as well as optionally between the virtual machines 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the virtual machines 862A-R may operate as servers; the same would be true for the hybrid network device 806; in the case of the special-purpose network device 802, one or more such servers could also be run on a hypervisor executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 8D illustrates a network with a single network element on each of the NDs of FIG. 8A and a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that a centralized approach 874 (also known as software-defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol).

The network intelligence is centralized in the centralized control plane 876 executing on electronic devices that are typically separate from the NDs. For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888, which includes applications 142-144 of FIG. 1. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

The network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software.

A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding table best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network element managed by a software-defined networking (SDN) controller, the method comprising:
   receiving a packet at the network element implemented by one or more network devices;
   determining whether the packet contains a fragment of an original Internet protocol (IP) packet, wherein the original IP packet is fragmented into a plurality of ordered fragments, and wherein a first fragment of the plurality of ordered fragments contains one or more fields associated with open system interconnection layers 4-7;
   upon determining the packet contains a fragment of the original IP packet, determining whether the packet contains the first fragment of the original IP packet;
   upon determining that the packet contains the first fragment of the original IP packet,
      adding an entry to a fragment information table of the network element, the entry being associated with the original IP packet and comprising data contained in the first fragment in the one or more fields associated with open system interconnection layers 4-7, wherein the entry is used by the network element to process non-first fragments of the original IP packet; and
      before all fragments of the original IP packet are received and after the entry is added to the fragment information table, processing, by the network element, the first fragment of the original IP packet based on the data contained in the first fragment in the one or more fields associated with open system interconnection layers 4-7; and
   upon determining that the packet contains a non-first fragment of the original IP packet, processing, by the network element, the packet based on the fragment information table unless no matching entry is found and delay of processing the packet is over a delay threshold, wherein processing the packet includes forwarding the packet or discarding the packet.

2. The method of claim 1, the processing the packet based on the fragment information table further comprising:
   upon determining that the packet contains the non-first fragment of the original IP packet, checking the fragment information table for a matching entry associated with the original IP packet; and
   upon finding the matching entry, processing the packet based on the data included in the matching entry.

3. The method of claim 2, further comprising:
   upon not finding the matching entry, delaying processing of the non-first fragment of the original IP packet for a period of time;
   continuing to check the fragment information table for a matching entry;
   while delaying for the period of time the processing of the non-first fragment of the original IP packet, receiving a subsequent packet that contains the first fragment of the original IP packet; and
   responsive to finding in the fragment information table a matching entry associated with the original IP packet, the matching entry containing data from the first fragment of the original IP packet, processing the non-first fragment of the original IP packet based on the data in the matching entry.

4. The method of claim 3, further comprising:
   monitoring the delay threshold prior to continuing to check the fragment information table for a matching entry; and
   discarding the packet when the delay threshold is exceeded.

5. The method of claim 1, wherein the processing the first fragment of the original IP packet includes forwarding the first fragment to a specific network element based on the data contained in the first fragment in the one or more fields associated with open system interconnection layers 4-7.

6. The method of claim 1, wherein the fragment information table entry comprises data includes at least one of:
   a source IP address;
   a destination IP address;
   a protocol type;
   a destination port number; and
   an original IP packet identification.

7. The method of claim 1, wherein the network element is an OpenFlow switch.

8. The method of claim 1, wherein the one or more fields of the original IP packet associated with open system interconnection layers 4-7 are header fields of the original IP packet.

9. An apparatus to be managed by a software-defined networking (SDN) controller, comprising:
   a processor; and
   a non-transitory machine readable storage media coupled to the processor and storing packet processing software that is executed by the processor, causes the processor to:
      receive a packet,
      determine whether the packet contains a fragment of an original Internet protocol (IP) packet, wherein the original IP packet is fragmented into a plurality of ordered fragments, and wherein a first fragment of the plurality of ordered fragments contains one or more fields associated with open system interconnection layers 4-7,
      upon a determination that the packet contains a fragment of the original IP packet, determine whether the packet contains the first fragment of the original IP packet,
      upon a determination that the packet contains the first fragment of the original IP packet,
         add an entry into a fragment information table of the apparatus, the entry being associated with the original IP packet and comprising data contained in the first fragment in the one or more fields associated with open system interconnection layers 4-7, wherein the entry is used to process non-first fragments of the original IP packet, and
         process the first fragment of the original IP packet, after the addition of the entry to the fragment information table, based on the data contained in the first fragment in the one or more fields associated with open system interconnection layers 4-7, and upon a determination that the packet contains a non-first fragment of the original IP packet, process the packet based on the fragment information table unless no matching entry is found and delay of processing the packet is over a delay threshold, wherein processing the packet includes forwarding the packet or discarding the packet.

10. The apparatus of claim 9, wherein the processing of the packet based on the fragment information table is further to:

upon the determination that the packet contains the non-first fragment of the original IP packet, check the fragment information table for a matching entry associated with the original IP packet, and upon finding the matching entry, process the packet based on the data included in the matching entry.

11. The apparatus of claim 10, wherein the check of the fragment information table for a matching entry is to:

upon failure to find the matching entry, delay processing of the non-first fragment of the original IP packet for a period of time, continue to check the fragment information table for a matching entry, and after receiving a subsequent packet that contains the first fragment of the original IP packet, find in the fragment information table a matching entry associated with the original IP packet, the matching entry containing data from the first fragment of the original IP packet, process the non-first fragment of the original IP packet based on the data in the matching entry.

12. The apparatus of claim 11, wherein the check of the fragment information table for a matching entry is further to:

monitor the delay threshold prior to continuing to check the fragment information table for a matching entry, and discard the packet upon determining the delay threshold is exceeded.

13. The apparatus of claim 12, wherein the delay threshold is configured with a maximum number of tries, and the packet processing software further causes the processor to:

upon failure to find a matching entry from the fragment information table:
  increment a counter value, and
  determine that the delay threshold is exceeded when the counter value exceeds a configured maximum number of tries.

14. The apparatus of claim 9, wherein the apparatus is an OpenFlow switch of the software-defined networking (SDN) system.

15. A non-transitory computer-readable storage medium storing instructions, that is executed by a processor, cause the processor to perform operations in a network element managed by a software-defined networking (SDN) controller, the operations comprising:

receiving a packet at the network element implemented by one or more network devices;

determining whether the packet contains a fragment of an original Internet protocol (IP) packet, wherein the original IP packet is fragmented into a plurality of ordered fragments, and wherein a first fragment of the plurality of ordered fragments contains one or more fields associated with open system interconnection layers 4-7;

upon determining the packet contains a fragment of the original IP packet, determining whether the packet contains the first fragment of the original IP packet;

upon determining that the packet contains the first fragment of the original IP packet,
  adding an entry to a fragment information table of the network element, the entry being associated with the original IP packet and comprising data contained in the first fragment in the one or more fields associated with open system interconnection layers 4-7, wherein the entry is used by the network element to process non-first fragments of the original IP packet; and
  before all fragments of the original IP packet are received and after the entry is added to the fragment information table, processing, by the network element, the first fragment of the original IP packet based on the data contained in the first fragment in the one or more fields associated with open system interconnection layers 4-7; and upon determining that the packet contains a non-first fragment of the original IP packet, processing, by the network element, the packet based on the fragment information table unless no matching entry is found and delay of processing the packet is over a delay threshold, wherein processing the packet includes forwarding the packet or discarding the packet.

16. The non-transitory computer-readable storage medium of claim 15, the processing the packet based on the fragment information table further comprising:

upon determining that the packet contains the non-first fragment of the original IP packet, checking the fragment information table for a matching entry associated with the original IP packet; and upon finding the matching entry, processing the packet based on the data included in the matching entry.

17. The non-transitory computer-readable storage medium of claim 16, the operations further comprising:

upon not finding the matching entry, delaying processing of the non-first fragment of the original IP packet for a period of time;

continuing to check the fragment information table for a matching entry;

while delaying for a period of time the processing of the non-first fragment of the original IP packet, receiving a subsequent packet that contains the first fragment of the original IP packet; and responsive to finding in the fragment information table a matching entry associated with the original IP packet, the matching entry containing data from the first fragment of the original IP packet, processing the non-first fragment of the original IP packet based on the data in the matching entry.

18. The non-transitory computer-readable storage medium of claim 17, the operations further comprising:

monitoring the delay threshold prior to continuing to check the fragment information table for a matching entry; and discarding the packet when the delay threshold is exceeded.

19. The non-transitory computer-readable storage medium of claim 15, the processing the first fragment of the original IP packet includes forwarding the first fragment to a specific network element based on the one or more fields associated with open system interconnection layers 4-7.

20. The non-transitory computer-readable storage medium of claim 18, wherein the fragment information table entry comprises data including at least one of:
   a source IP address;
   a destination IP address;
   a protocol type;
   a destination port number; and
   an original IP packet identification.

* * * * *